United States Patent [19]

Schneider

[11] 4,394,062
[45] Jul. 19, 1983

[54] SPLITTABLE FIBER OPTICAL WAVEGUIDE AND METHOD OF MANUFACTURE

[75] Inventor: Hartmut Schneider, Munich, Fed. Rep. of Germany

[73] Assignee: Siemens Aktiengesellschaft, Berlin & Munich

[21] Appl. No.: 124,608

[22] Filed: Feb. 25, 1980

[30] Foreign Application Priority Data

Mar. 9, 1979 [DE] Fed. Rep. of Germany ....... 2909356

[51] Int. Cl.³ ............................................. G02B 5/172
[52] U.S. Cl. ................................. 350/96.33; 65/3.11
[58] Field of Search ............ 350/96.15, 96.30, 96.33; 65/3.11, 3.13

[56] References Cited

U.S. PATENT DOCUMENTS

| | | | |
|---|---|---|---|
| 3,063,094 | 11/1962 | Warthen | 65/2 |
| 4,083,625 | 4/1978 | Hudson | 350/96.15 |
| 4,134,642 | 1/1979 | Kapron et al. | 350/96.33 |
| 4,179,189 | 12/1979 | Kaminow et al. | 350/96.33 |
| 4,259,016 | 3/1981 | Schiffner | 356/350 |

FOREIGN PATENT DOCUMENTS 2510114 9/1976 Fed. Rep. of Germany.
2717535 11/1978 Fed. Rep. of Germany ... 350/96.15

*Primary Examiner*—John D. Lee
*Attorney, Agent, or Firm*—Hill, Van Santen, Steadman, Chiara & Simpson

[57] ABSTRACT

A splittable fiber optical waveguide and a method of manufacture characterized by the fiber having at least one optical core embedded in a cladding material and at least one pair of longitudinal indentations on an outer surface of the fiber. The splittable fiber is formed by being drawn from a preform which has longitudinal grooves or indentations on an outer surface.

9 Claims, 4 Drawing Figures

SPLITTABLE FIBER OPTICAL WAVEGUIDE AND METHOD OF MANUFACTURE

BACKGROUND OF THE INVENTION

The present invention is directed to a splittable optical fiber waveguide which is particularly useful as an optical directional coupler and which fiber waveguide has at least one fiber optical waveguide core embedded in a cladding material.

A splittable fiber optical waveguide having a waveguide core embedded in a cladding material is known and an example is disclosed in German O.S. 25 10 114. This waveguide is formed by drawing from a massive initial body and has thermal forces, which were created in by an axially unsymmetrical overheating in the forming and softening zone during the drawing process. By means of these forces, a splitting tendency occurs in the fiber along its axis. With a breaking up of the fiber manufactured in this manner, fiber pieces result which have a longitudinal split proceeding from a middle point of the fiber and the splits have different lengths.

SUMMARY OF THE INVENTION

The present invention is directed to providing a fiber optical waveguide having at least one optical core embedded in a cladding material in which the splitting plane can be predetermined. Besides this, multi-channel fiber optical waveguides with several fiber cores embedded in a common cladding material can be splittable along several planes.

To accomplish these goals, the fiber optical waveguide is provided with at least two longitudinally extending indentations in an outer surface thereof. If wedges are pressed into these indentations, the fiber can be split at once along the plane defined by the pair of identations. The length of the fiber, which is to be split in this manner, can be easily increased by applying the wedges consecutively along different locations of the indentations of the fiber. If for example, a one channel fiber is to be split in a straight line through a midpoint of the fiber, then the fiber must have two indentations, which lie diametrically opposite one another.

If it is a multi-channel fiber optical waveguide, and if the fiber ends are to be broken up into partial fibers with each partial fiber having a single fiber core, the fiber, in accordance with the invention, is provided with a pair of longitudinally extending indentations which lie in a plane which passes between two adjacent fibers and extends perpendicular to the plane formed by the adjacent fibers. When the fiber is split on the plane of the indentations, a cut will occur midway between the two adjacent cores. If, for example, the fiber optical waveguide has two fiber cores, the indentations are oriented on the outer surface of the fiber so that the plane of the indentations will be perpendicular to the plane determined by the two cores.

The method of manufacturing the splittable fiber optical waveguide includes providing a preform having at least two longitudinal indentations on an outer surface thereof and subsequently drawing the preform into the fiber. The step of providing the preform may include providing a rod shaped preform such as by collapsing a quartz tube which is coated on the interior wall with a layer of cladding material and has material for forming the core and the indentations are formed in the outer surface of the rod shaped preform by means of sawing or by means of etching or the such. When the preform with the longitudinal grooves is drawn into the fiber, the sharp edges of these grooves would be partially rounded to form the indentations. Nevertheless, sufficiently deep indentations will remain to provide definite starting points for the splitting wedges. In the case of a large amount of rounding of the grooves to produce shallow indentations, the fiber surface can be additionally notched in the indentations before the step of splitting.

Instead of drawing the fiber from a rod shaped preform, the fiber can be provided by a double crucible method in which the fiber is drawn from a double crucible. The indentations are then simply formed by providing a nozzle for the outer crucible which has an appropriate shaped opening to produce the indentations in the outer surface of the fiber. A further possibility of providing the fibers with indentations consists in etching the indentations in the outer surface after drawing the preform from the double crucible.

DESCRIPTION OF THE PREFERRED EMBODIMENTS

Figure 2:
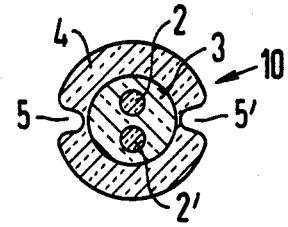
FIG. 2 is an enlarged cross sectional view of a splittable fiber in accordance with the present invention.

The principles of the present invention are particularly useful in a finished splittable fiber generally indicated at 10 in FIG. 2. The fiber 10 as illustrated has a pair of fiber optical cores 2 and 2', which are embedded in a cladding material 3, which in turn is encased in a quartz layer which was from a collapsed quartz tube. Since this fiber 10 is to be split into a pair of partial fibers 11 and 12 with the partial fiber 11 having the core 2 and the partial fiber 12 having the core 2', the splitting plane must pass between the pair of cores 2 and 2'. To locate the splitting plane, the fiber 10 has a pair of identations 5 and 5' on an outer surface of the layer 4 which indentations define the splitting plane which bisects the distance between the cores 2 and 2' and extends perpendicular to the plane defined by the cores. As illustrated the depressions or indentations 5 and 5' have rounded edges, substantially reduce the thickness of the cladding at each of said identations, create starting points for splitting wedges 6 and 6', and extend in a longitudinal direction along the axis of the fiber 10.

Figure 1:
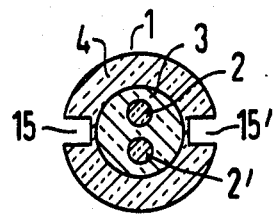
FIG. 1 is a cross sectional view of a preform in accordance with the present invention.

To form the fiber 10, a preform 1, which will be subsequently drawn into the fiber 10, is provided. As illustrated in FIG. 1, the preform 1 has the two fiber cores 2 and 2' surrounded by a common cladding material 3. The cladding material 3 is surrounded by the collapsed quartz glass tube 4. Two grooves 15 and 15' are formed in the outer surface of the preform to lie diametrically opposite one another. These two grooves 15 and 15' may be formed by being sawed into the outer surface or by another means such as by etching. As illustrated, each of the grooves 15 and 15' has sharp corners, which during the subsequent drawing process will become rounded to produce the indentations 5 and 5'.

Figure 3:
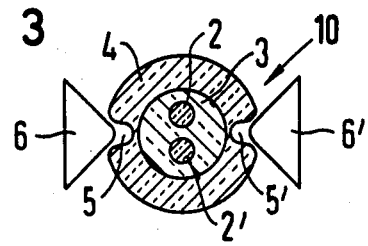
FIG. 3 is an enlarged cross sectional view of a splittable fiber in accordance with the present invention at the time of splitting.

To split the splittable fiber 10, a pair of wedges 6 and 6' (see FIG. 3) are pressed into the indentations 5 and 5'. In an advantageous manner, one will introduce the two wedges with a definite forward motion uniformly from both sides into the indentations and will increase the pressure upon the fiber from both sides gradually until the fiber splits. In order to increase the length of the split of the fiber, the wedges such as 6 and 6' will be moved progressively along the fiber axis.

Figure 4:
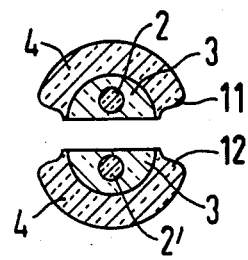
FIG. 4 is an enlarged cross sectional view of a pair of partial fibers formed from the splittable fiber of the present invention.

In FIG. 4, the split fiber with its two identical halves or partial fibers 11 and 12 is illustrated. Each of these partial fibers, as pointed out hereinabove, will contain one core.

In the illustrated embodiment of the invention, the fiber had a pair of cores. If the fiber has more than two cores, and if they are arranged on a circle, the fiber can then be split into partial fibers with each partial fiber having one core. This is accomplished by providing splitting planes which extend along rays from the midpoint of the fiber and between the adjacent cores. Each of these splitting planes will be defined by two longitudinally extending indentations on the outer surface of the fiber.

Although various minor modifications may be suggested by those versed in the art, it should be understood that I wish to embody within the scope of the patent granted hereon, all such modifications as reasonably and properly come within the scope of my contribution to the art.

I claim:

1. A method for manufacturing an optical device particularly an optical directional coupler comprising the steps of providing a splittable optical fiber waveguide having at least one fiber optical core surrounded by a cladding material, said waveguide having at least two longitudinally extending indentations in an outer surface, and pressing wedges into the longitudinal indentations uniformly to cause a portion of the optical fiber waveguide to split along a plane defined by said indentations to define a split portion of the waveguide.

2. A method according to claim 1, wherein the step of providing a splittable optical fiber waveguide comprises forming a preform having a longitudinally extending indentation in an outer surface thereof for each of the longitudinal indentations of the surface of the waveguide and subsequently drawing the fiber from said preform.

3. A method according to claim 2, which includes a step of notching each indentation after the step of drawing and before the step of pressing wedges to ensure the desired depth of each indentation.

4. A method according to claim 2, wherein the step of forming the preform with the longitudinal indentations includes utilizing a double crucible method of forming the preform and includes providing the nozzle on the exterior crucible with a shape to form the indentations in the outer surface of the material drawn through the exterior nozzle.

5. A method according to claim 2, wherein the step of forming the preform includes providing a rod shaped preform and subsequently sawing the longitudinally extending indentations in an outer surface thereof.

6. A method according to claim 2, wherein the step of forming the preform includes providing a rod shaped preform and subsequently etching the indentations into an outer surface thereof.

7. An optical device such as an optical directional coupler comprising a splittable optical fiber waveguide with a split portion, said waveguide having an outer surface and at least one fiber optical core being surrounded by a cladding material, said splittable waveguide having at least a pair of longitudinally extending indentations in an outer surface, each of said indentations having a substantial depth with a corresponding reduction in the thickness of the cladding at each indentation to create starting points for splitting wedges and to receive the splitting wedges and said split portion of the waveguide extending between the pair of indentations.

8. An optical device according to claim 7, wherein the optical fiber waveguide has at least two fiber optical cores arranged with the split portion extending therebetween.

9. A splittable optical waveguide especially adapted for use as an optical directional coupler, said waveguide having several fiber optical waveguide cores surrounded by a cladding material, said splittable waveguide having at least two longitudinally extending indentations in an outer surface lying in a plane which passes between two adjacent cores and extends perpendicular to a plane formed by the two adjacent cores, each of said indentations having a sufficient depth with a corresponding reduction in the thickness of the cladding at each indentation to create starting points for splitting wedges and to receive splitting wedges to form a split between said indentations.

* * * * *